United States Patent
Hoffmann

(10) Patent No.: US 10,072,925 B2
(45) Date of Patent: Sep. 11, 2018

(54) METHOD AND DEVICE FOR DETECTION OF ROTATED SEGMENTS IN A MULTI-SEGMENT ROD TRANSFERRED IN A MACHINE USED IN CIGARETTE PRODUCTION INDUSTRY

(71) Applicant: International Tobacco Machinery Poland Sp. z o.o, Radom (PL)

(72) Inventor: Hans-Reiner Hoffmann, Grevenbroich (DE)

(73) Assignee: INTERNATIONAL TOBACCO MACHINERY POLAND SP. Z O.O., Radom (PL)

( * ) Notice: Subject to any disclaimer, the term of this patent is extended or adjusted under 35 U.S.C. 154(b) by 332 days.

(21) Appl. No.: 14/782,631

(22) PCT Filed: Apr. 8, 2014

(86) PCT No.: PCT/EP2014/057050
§ 371 (c)(1),
(2) Date: Oct. 6, 2015

(87) PCT Pub. No.: WO2014/166944
PCT Pub. Date: Oct. 16, 2014

(65) Prior Publication Data
US 2016/0091301 A1    Mar. 31, 2016

(30) Foreign Application Priority Data

Apr. 8, 2013 (PL) .......................................... 403464

(51) Int. Cl.
| | | |
|---|---|---|
| G01B 11/24 | (2006.01) |
| A24C 5/34 | (2006.01) |
| A24D 3/02 | (2006.01) |
| G01B 11/10 | (2006.01) |
| G01B 11/245 | (2006.01) |
| A24C 5/343 | (2006.01) |

(52) U.S. Cl.
CPC .............. *G01B 11/24* (2013.01); *A24C 5/343* (2013.01); *A24C 5/3412* (2013.01);
(Continued)

(58) Field of Classification Search
CPC ....... G01B 11/24; G01B 11/245; G01B 11/25; G01B 11/2513; G01B 11/2518;
(Continued)

(56) References Cited

U.S. PATENT DOCUMENTS

| | | |
|---|---|---|
| 4,001,579 A | 1/1977 | Lebet et al. |
| 4,212,541 A | 7/1980 | Ducommun et al. |

(Continued)

FOREIGN PATENT DOCUMENTS

| | | |
|---|---|---|
| CN | 1519538 A | 8/2004 |
| DE | 10304503 A1 | 8/2004 |

(Continued)

*Primary Examiner* — Hina F Ayub
*Assistant Examiner* — Amanda Merlino
(74) *Attorney, Agent, or Firm* — Browdy and Neimark, PLLC

(57) ABSTRACT

A method and device for detection of rotated segments in a continuous multi-segment rod transferred in a machine used in tobacco industry. A signal of an error of the shape of said continuous multi-segment rod is generated, the rod including a plurality of segments arranged one after another in a common wrapping, in which the rod that is transferred in a direction along its axis is simultaneously scanned by optical sensors, the directions of scanning of the optical sensors being oriented at an angle other than 90° to each other. The rod diameter is measured by repeated scans such that the shortest segment of the rod is scanned at least once, the results of the scans being compared with a predetermined reference value, and each difference between the results of the scans and the predetermined value is converted into the signal of the error of shape.

13 Claims, 10 Drawing Sheets

(52) U.S. Cl.
CPC ......... *A24D 3/0229* (2013.01); *A24D 3/0287* (2013.01); *G01B 11/105* (2013.01); *G01B 11/245* (2013.01); *G01B 11/2433* (2013.01)

(58) Field of Classification Search
CPC ....... G01B 11/08; G01B 11/10; G01B 11/105; G01B 11/12; G01B 11/2433
See application file for complete search history.

(56) References Cited

U.S. PATENT DOCUMENTS

| | | | | |
|---|---|---|---|---|
| 5,930,734 | A * | 7/1999 | Hofmann | ............... G01B 11/10 356/6 |
| 6,252,661 | B1 * | 6/2001 | Hanna | ................ G01B 11/2425 356/394 |
| 7,738,121 | B2 * | 6/2010 | Spalding | .............. G01B 11/245 250/559.24 |
| 2006/0109485 | A1 | 5/2006 | Laemmel | |
| 2007/0091326 | A1 * | 4/2007 | Schroeder | ........... A24C 5/3412 356/625 |
| 2011/0162665 | A1 | 7/2011 | Burov et al. | |

FOREIGN PATENT DOCUMENTS

| | | |
|---|---|---|
| EP | 0565090 A1 | 10/1993 |
| GB | 2043962 A | 10/1980 |
| JP | 2006-018227 A | 8/1995 |
| JP | 08201029 A | 8/1996 |
| JP | 2006-153872 A | 6/2006 |
| PL | 216616 B1 | 4/2014 |

\* cited by examiner

METHOD AND DEVICE FOR DETECTION OF ROTATED SEGMENTS IN A MULTI-SEGMENT ROD TRANSFERRED IN A MACHINE USED IN CIGARETTE PRODUCTION INDUSTRY

The invention relates to a method and a device for detection of rotated segments in a multi-segment rod transferred in a machine used in tobacco industry.

The filters used in the tobacco industry may be made of one material or may be composed of many materials having various physical proprieties.

In the cigarettes produced nowadays the filters comprising several segments of different filtering proprieties are used more and more often. Machines for production of individual multi-segment filter rods from continuous multi-segment filter rods are known in the art.

The above mentioned machines combine many different segments delivered from various feeding devices, the segments having been formed by cutting filter rods while transferring them on e.g. a drum conveyor by means of a cutting head equipped with disc knives. Depending on the type of the machine, the individual segments are arranged side by side or one after another so as to finally form a continuous multi-segment rod which is cut into individual multi-segment rods. During further steps of the production process, the multi-segment rods are cut into individual multi-segment filters applied into individual cigarettes.

An important aspect of the multi-segment rods production is their quality. High quality is attained by maintaining precise dimension of the segments, e.g. their diameters and lengths, as well as by maintaining a defined sequence of segments and the clearances between them. It is also important to keep the segments aligned with the axis of the formed rod or the direction of its transport.

At present, increasingly short segments are used by cigarette producers, e.g. the segments having their length (axial dimension) close to their diameter. The filters having their length smaller than their diameter, e.g. 5 mm or smaller, are also used. With such proportions a risk exists of the segment being rotated so as its axis becomes non-parallel, for example transversal to the axis of the rod in which it is located.

The above is possible because the dimensions of the space provided for such a segment enable a slightly deformed segment to be oriented both with its axis in parallel to the axis of the rod, and substantially perpendicularly to the latter. When the deformation of the segment is slightly bigger, its slanted position in relation to the axis of the rod is also possible.

Besides, both the direction and the angle of rotation of such a segment in relation to the rod are totally random. Further, it is both the segment and the wrapping of the rod that become deformed because the wrapping tends to locally adapt in shape to the segment.

In other words, rotation of a segment results in that the formed rod undergoes deformation to some extent, meaning that the rod becomes non-cylindrical in the area of the dislocated segment. According to the requirement of manufacturers multi-segment rods containing rotated segments should be rejected from production.

Systems for controlling the quality of multi-segment rods are known in the art. Such systems have been described in U.S. Pat. No. 4,001,579, U.S. Pat. No. 4,212,541, GB 2043962 and US 2011/162665A1. The systems disclosed in the above listed publications are designed for checking the types of the segments, the mutual arrangement of the segments in a rod and for adjusting the lengths of cutting of multi-segment rods. However, no methods of detection of rotated segments have been disclosed in these publications.

The object of the present invention is to provide a method and a device for fast and reliable detection of rotated segments in such a way that the detection occurs irrespective of the direction of rotation of the segments.

According to the invention a method is provided for detection of rotated segments in a continuous multi-segment rod transferred in a machine used in tobacco industry, the method including generating a signal of an error of the shape of said continuous multi-segment rod, the rod comprising a plurality of segments arranged one after another in a common wrapping, in which the rod that is transferred in a direction along its axis is simultaneously scanned by means of at least two optical sensors, the directions of scanning of the two optical sensors being oriented at an angle other than 90° to each other, wherein the diameter of the rod is measured by repeated scannings at such a frequency that the shortest segment of the rod is scanned at least once, the results of the scannings being compared with a predetermined reference value, and each difference between any of the results of the scannings and the predetermined value is converted into the signal of the error of shape.

The continuous multi-segment rod is preferably scanned by means of two optical sensors, the directions of scanning of the optical sensors being oriented at an angle between 40° and 60°, preferably 45°.

According to the invention a device is provided for detection of rotated segments in a continuous multi-segment rod transferred in a machine used in tobacco industry, by generating a signal of an error of the shape of the said rod, the rod comprising a plurality of segments arranged one after another in a common wrapping, the device comprising at least two optical sensors for scanning the transferred rod, the directions of scanning of the two optical sensors being oriented at an angle other than 90° to each other, wherein the optical sensors are adapted for measuring the diameter of the rod by repeated scannings at such a frequency that the shortest segment of the rod is scanned at least once, the device further comprising a controller enabling to compare the results of successive scannings with a predetermined reference value and to convert each difference between any of the results of the scannings and the predetermined value into the signal of the error of shape.

The device according to the invention preferably comprises two optical sensors the directions of scanning of the optical sensors being oriented at an angle between 40° and 60°, preferably 45°.

Each optical sensor may comprise a source of radiation preferably operating in the visible spectrum, and a photosensitive element, the source of radiation and the photosensitive element being located on mutually opposite sides of the transferred continuous multi-segment rod.

Preferably the optical sensors are linear sensors.

Preferably the planes of scanning of the sensors are substantially coplanar.

The optical sensors may also be surface sensors.

Preferably the areas of scanning of the sensors are substantially the same.

The advantage of the method and the device according to the invention consists in their effective functioning while keeping it simple and cost effective to realize to invention.

Preferred embodiments of the invention have been further described with reference to the appended drawing in which.

Figure 1:
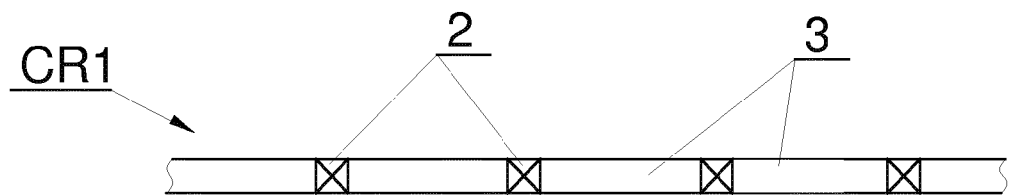
FIG. 1 shows an exemplary continuous multi-segment filter rod.
Figure 2:
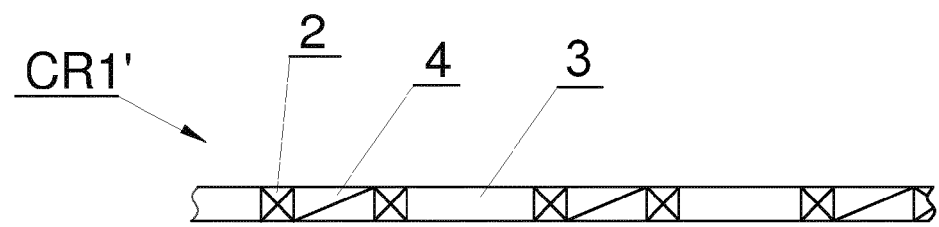
FIG. 2 shows another exemplary continuous multi-segment filter rod.

In FIGS. 1 and 2 fragments of the exemplary continuous multi-segment filter rods CR1, CR1' are shown comprising alternating segments 2 and 3 in FIG. 1 and segments 2, 3 and 4 in FIG. 2. Typically, the segments are cylindrical, solid or hollow, made of different filtering materials. The segments may form a rod in which they are arranged end-to-end or one after another with clearances between them and they are enclosed in a common wrapping, in particular a paper wrapping.

Figure 3A:
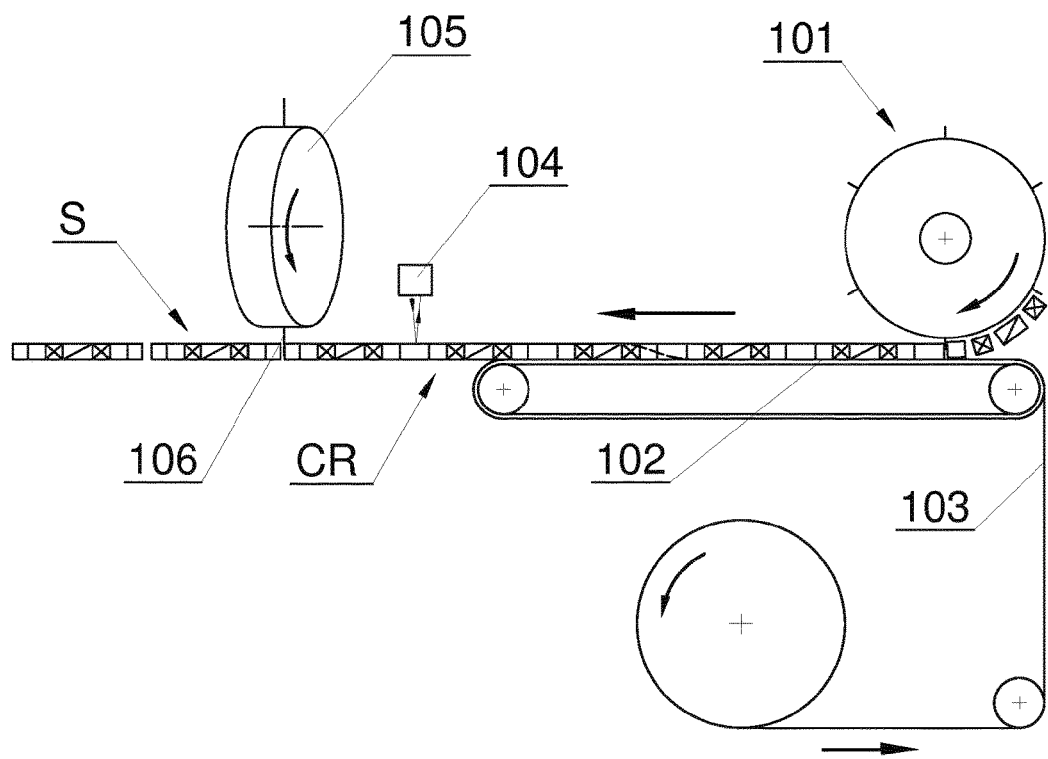
FIG. 3a shows a fragment of a machine for producing individual multi-segment rods.

In the figures the multi-segment rods are shown as if the wrapping were transparent. As seen in FIG. 3, showing a fragment of a machine for producing multi-segment rods S from the continuous rods CR1, CR1', a feeding assembly 101 delivers previously prepared in a known way filter segments onto a conveyor 102, a paper wrapping 103 being arranged on its surface. During the transport of the segments on the conveyor 102 the wrapping 103 is being wound in a known way around the segments and glued. A multi-segment rod CR formed in such a way is transferred through a zone of operation of a control assembly 104 and then cut into rods S by means of a cutting head 105 equipped with knives 106. Conventional elements for supporting and guiding the continuous rod CR have not been shown in the figure.

Figure 3B:
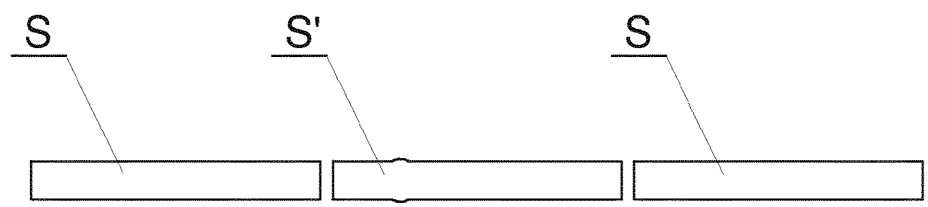
FIG. 3b shows the exemplary individual multi-segment rods, one of which presents an error of shape.

In FIG. 3b three exemplary individual multi-segment rods S, S' and S are shown, the rod S' presenting a fault that will be detected by means of a device according to the invention. Consequently, the rod S' will be discarded from the production process.

Figure 4:
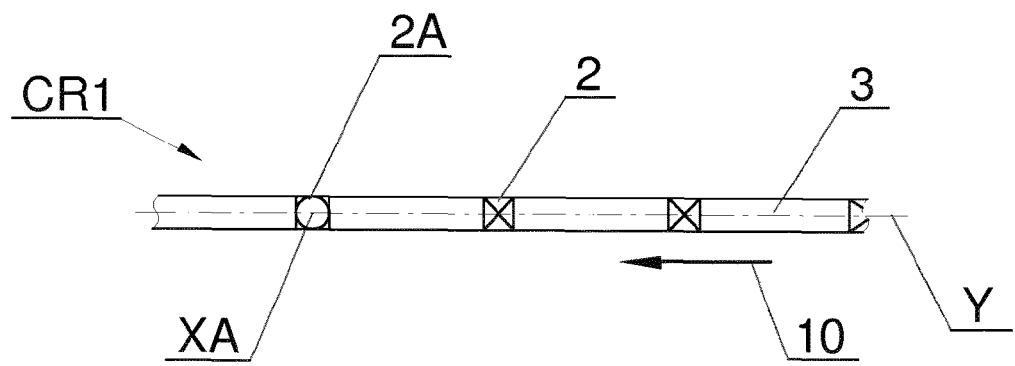
FIG. 4 shows the continuous multi-segment filter rod of FIG. 1 with one segment rotated.
Figure 5:
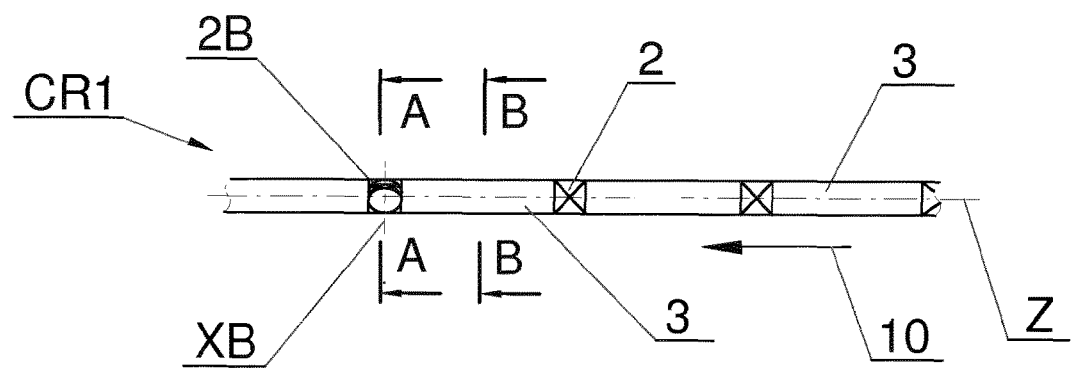
FIG. 5 shows the continuous multi-segment filter rod of FIG. 1 with one segment rotated in a different way.
Figure 6:
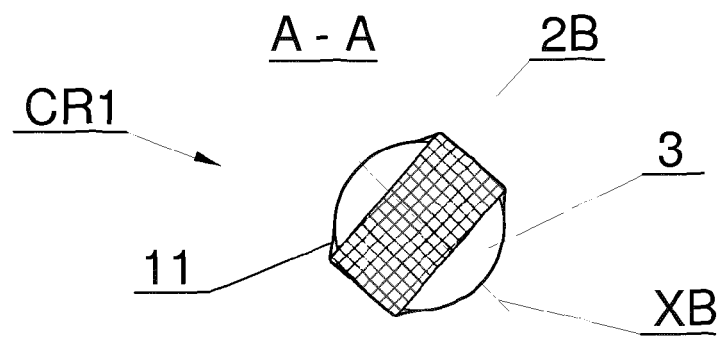
FIG. 6 shows a cross-section along a plane A-A of a rotated segment in a rod of FIG. 5.
Figure 7:
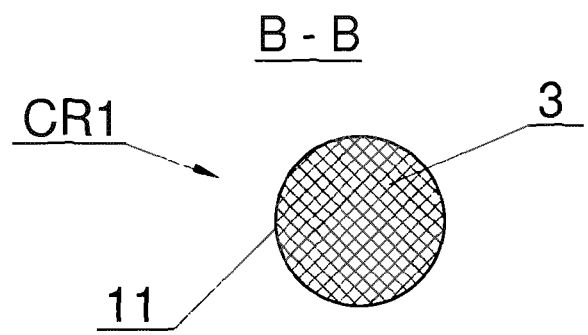
FIG. 7 shows a cross-section along a plane B-B of a rotated segment in a rod of FIG. 5.

The segment 2 is the shortest of the segments presented in both examples shown in FIGS. 1 and 2, its length being close to the diameter of the filter rod. In the production process of a filter multi-segment rod it may occur that such short segments become accidentally rotated. Such rotated segments are designated as 2A and 2B in FIGS. 4 and 5. The axial direction of transport of the rod in the production process is shown by an arrow 10. The axis Y of the continuous multi-segment rod CR1 in FIG. 4 lies in the plane of the drawing, while the axis XA of the rotated segment 2A is oriented perpendicularly to the drawing. The axis XB of the segment 2B in FIG. 5 is slanted in relation to the plane of the drawing and is perpendicular to the axis Z, although a slanted orientation of the axis XB in relation to the axis Z is also possible. FIGS. 6 and 7 show the cross-sections A-A and B-B of the segments 2B and 3 shown in FIG. 5. The reference 11 indicates the paper wrapping in which the segments of the continuous rod CR1 are enclosed. The wrapping 11 which is cylindrical along the whole rod, is deformed in the area of the rotated segment so as to enclose it. In other words, the wrapping 11 reverts from its cylindrical shape into a shape corresponding to the rotated segment 2B and then reverts back to the cylindrical shape. In FIG. 7 the wrapping 11 has a circular cross-section corresponding to the circular cross-section of the segment 3 around which it is shaped cylindrically.

Figure 8:
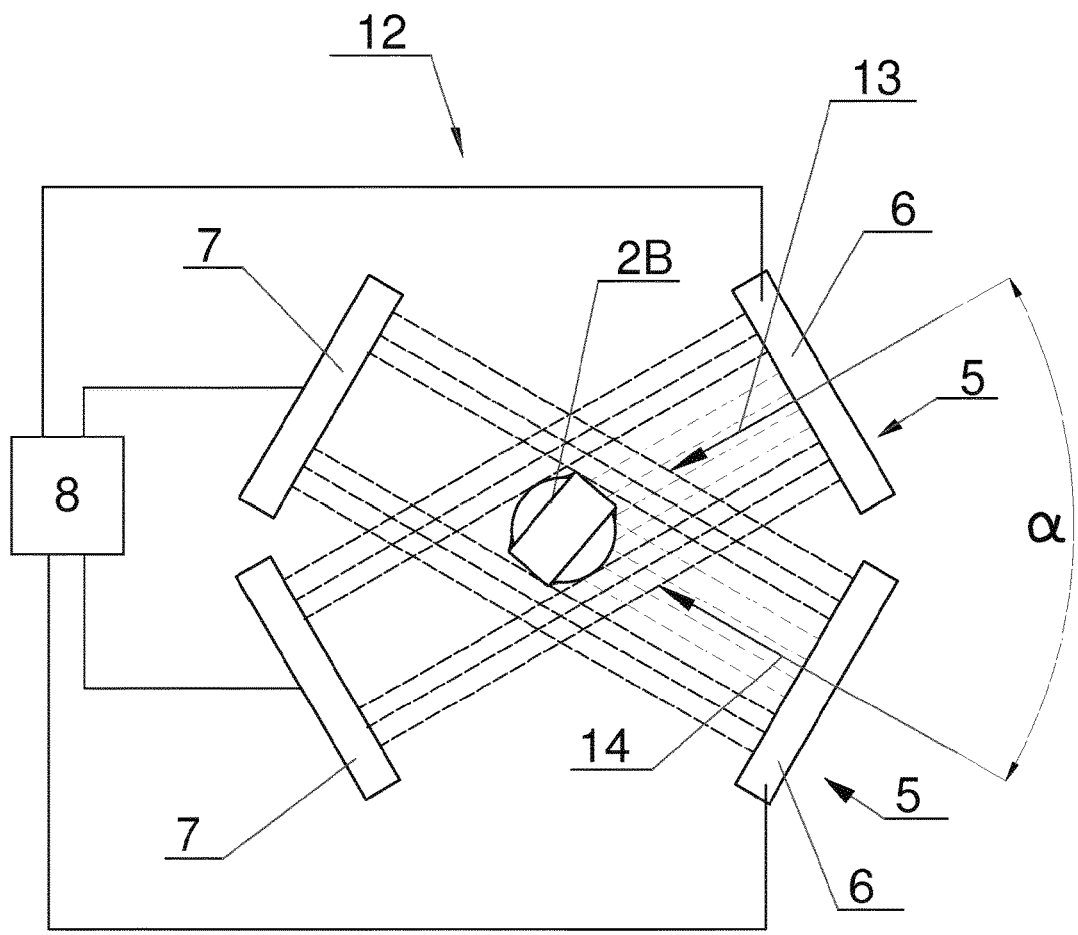
FIG. 8 shows an arrangement of two optical sensors.

In the production process, the continuous multi-segment filter rod CR goes through the area of operation of at least two optical sensors 5 forming together a shape sensor assembly 12 designed to measure the diameter of the rod, as shown in FIG. 8. The shape sensor assembly 12 may belong to the control assembly 104 shown in FIG. 3a. The sensors 5 operate in the plane of the drawing, while the continuous multi-segment rod moves in the direction perpendicular to the plane of the drawing. Each optical sensor 5 comprises a radiation source 6, operating for example in the visible spectrum, and a photosensitive element 7, both sensors 5 being associated with a controller 8. The radiation source 6 may be a linear or a surface source. The reference 9 shows the direction of scanning of the optical sensor 5.

FIG. 8 shows the shape sensor assembly 12 comprising two optical sensors 5 designed for scanning in the directions 13 and 14, the optical sensors being connected to the controller 8 for controlling the operation of the sensors 5. The scanning directions of the optical sensors are oriented at an angle α to each other, the angle α being different from 90°. Preferably the angle α between the scanning directions 13 and 14 is 45°. The effectiveness of detection is the highest when the angle is 45°. This is because a rotated segment of a multi-segment rod has a rectangular cross-section and the sensors may generate different values of a signal depending on the actual angle of rotation of the segment in relation to the direction of light falling on the rod. The signal is usually analogue. The sensors 5 are adapted to measure the diameter of the rod, in particular the diameters of its individual segments through repeated scannings.

The results of the measurements, i.e. the diameter values of the successive segments are transferred to the controller 8. In the case of detection of a difference between a certain result and a predetermined reference value, the controller 8 generates a signal of an error of shape. Consequently, the signal of an error of shape is generated each time when the diameter value of any segment is different from the reference value. The notion: "diameter of the rod" should be understood here as the actual diameter or as a dimension that is actually not a diameter (if the segment is rotated and consequently the rod is not cylindrical in this area). In fact it is a length located between the lengths A1 and B1 or A2 and B2 (see FIGS. 9a, 9b, 10a, 10b). According to the tests performed for various angles α between the directions of scanning of the sensors, the highest reliability in terms of a correct detection of the rotated segments has been achieved for the angle α equal to 45°. Importantly, the comparison of the obtained results and the generation of the signals of an error of shape (in other words an error of diameter) taking place in the controller 8 is faster than eg. the comparison of scanned images showing deformations of a rod. This is because the comparison of the results and the generation of the signals requires analysis of a much smaller amount of data.

Figure 9A:
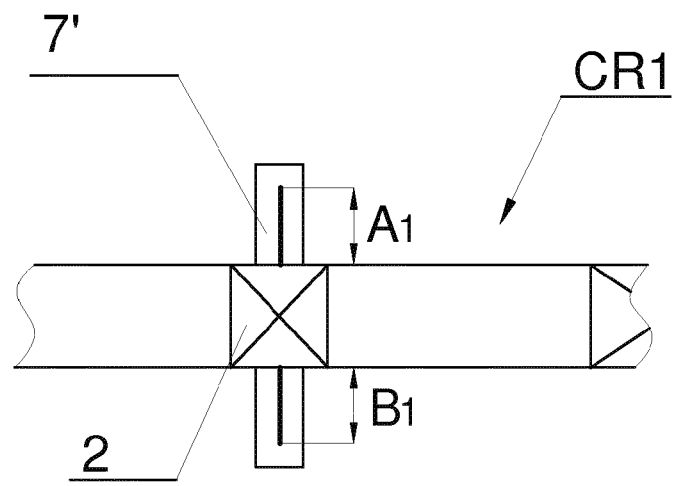
FIGS. 9a and 9b show the functioning of individual linear optical sensors in the case of a non-rotated segment.
Figure 9B:
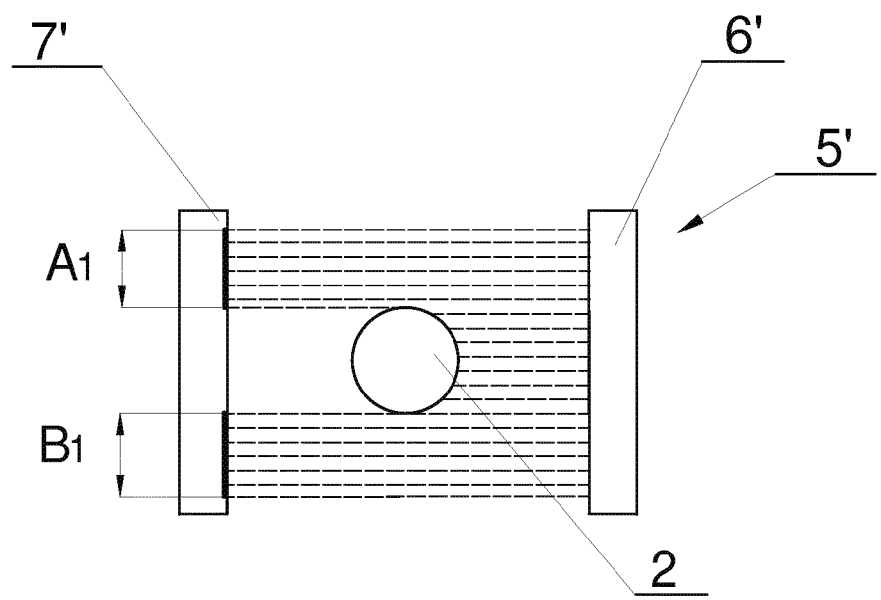

FIG. 9a shows an example of the device according to the invention, in which the photosensitive element is formed as a linear element 7'. During the production of the continuous multi-segment filter rod CR1, the linear radiation source 6' (FIG. 9a) illuminates the rod CR1 and partially the photosensitive element 7' (FIGS. 9a and 9b). If there are no rotated segments in the filter rod CR1 and no consequent error of shape occurs, two fragments (lengths) $A_1$ and $B_1$ of the photosensitive element 7' belonging to the linear sensor 5' are illuminated.

Figure 10A:
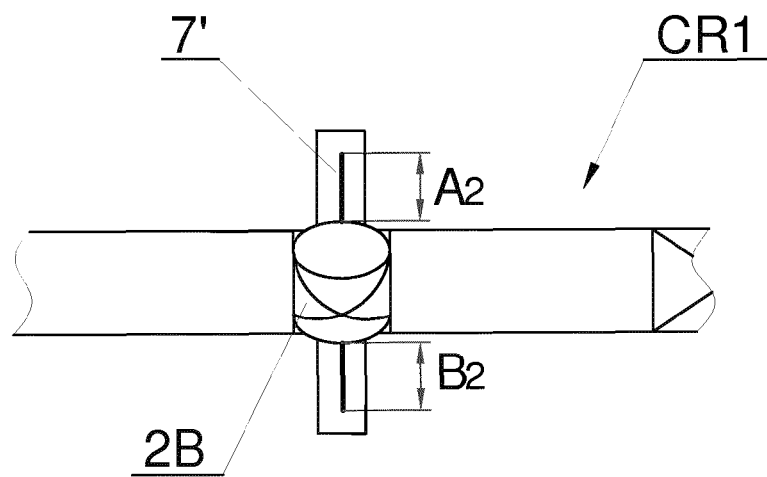
FIGS. 10a and 10b show the functioning of individual linear optical sensors in the case of a rotated segment.
Figure 10B:
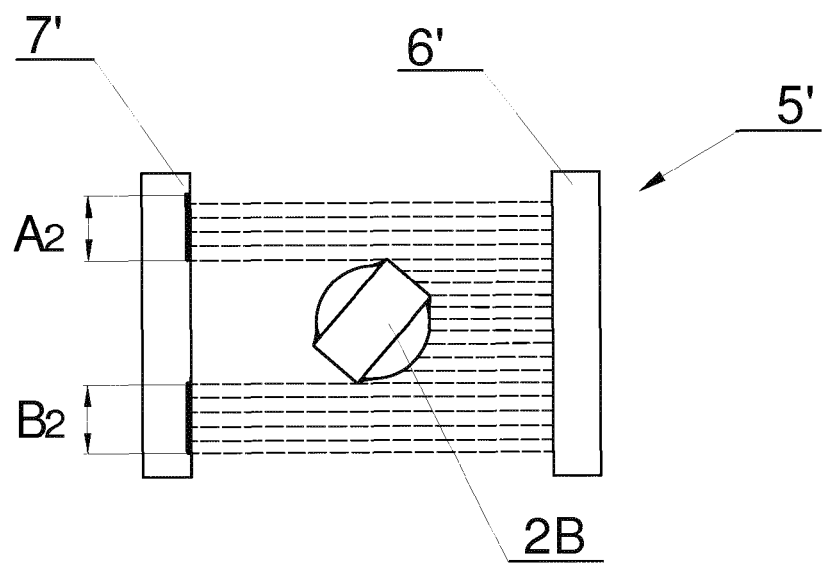

FIG. 10a shows a linear photosensitive element 7' as shown in FIG. 9a illuminated in two fragments $A_2$ and $B_2$ in consequence of the rotation of a segment 2B. FIG. 10b shows the same situation seen in the axial direction of the multi-segment rod CR1. Depending on the position of the optical sensor 5' in relation to the segment 2B, various situations are possible: where $A_2<A_1$ and $B_2<B_1$, where $A_2=A_1$ and $B_2<B_1$ or $B_2=B_1$ and $A_2<A_1$, as well as where $A_2=A_1$ i $B_2=B_1$ (the latter representing a situation where the deformation of the rod is "invisible" to the sensor). The values $A_1$ and $B_1$ indicated in FIG. 10a should be considered as the reference values stored in the controller 8.

In practice certain limit values $A_g$ and $B_g$ corresponding to values greater than the nominal rod diameter value should be entered into the controller 8. It means that a certain dimension tolerance should be maintained for the rod diameter which may vary to some extent in the production process. The controller 8 will generate the error of shape signal when one of the illuminated lengths of $A_1$, $A_2$, $B_1$, $B_2$ on the photosensitive element 7' is shorter than respectively $A_g$ or $B_g$. In the shape sensor assembly 12 (FIG. 8) comprising e.g. two linear optical sensors arranged at a suitable angle, in the situation where for one of the sensors $A_2=A_1$ and $B_2=B_1$ and for the other sensor $A_2<A_1$ and $B_2<B_1$, an error of shape signal generated by just one sensor would confirm that there is a rotated segment in the continuous multi-segment rod CR1. Irrespective of the position of the rotated segment the shape sensor assembly will always detect the shape error i.e. will find the rotated segment.

Figure 11A:
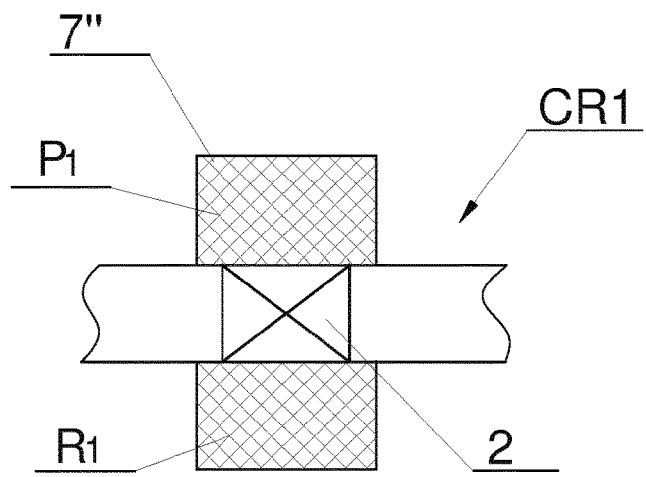
FIGS. 11a and 11b show the functioning of individual surface optical sensors in the case of a non-rotated segment.
Figure 11B:
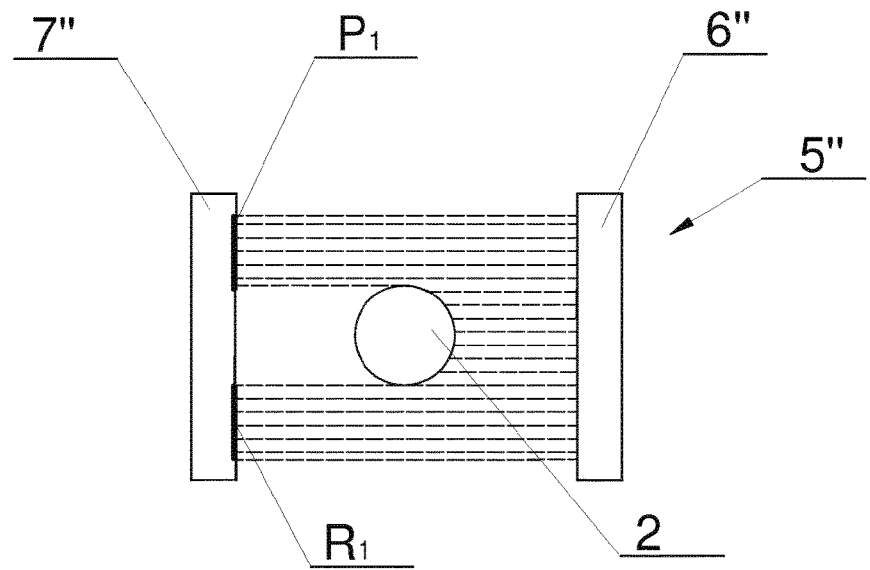

FIG. 11a shows an exemplary embodiment of the device according to the invention in which the photosensitive element is a surface element 7", for example a photosensitive matrix. During the manufacturing process, the continuous multi-segment rod CR1 and partially the photosensitive element 7" are illuminated by a flat radiation source 6" (FIGS. 11a and 11b). If there are no rotated segments in the multi-segment filter rod CR1 and hence there is no error of shape, two fragments of the element are illuminated—the areas $P_1$ and $R_1$ of the photosensitive element 7".

Figure 12A:
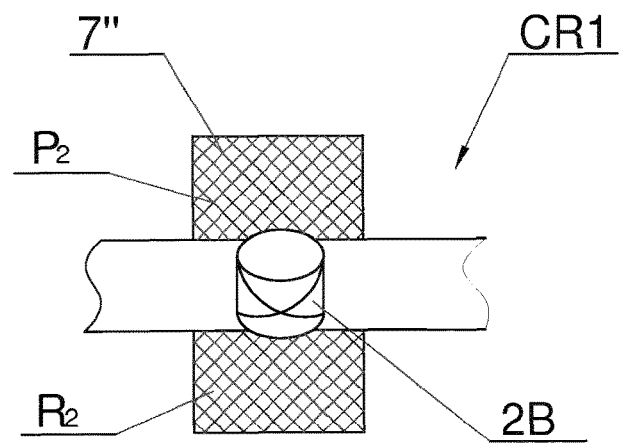
FIGS. 12a and 12b show the functioning of individual surface optical sensors in the case of a rotated segment.
Figure 12B:
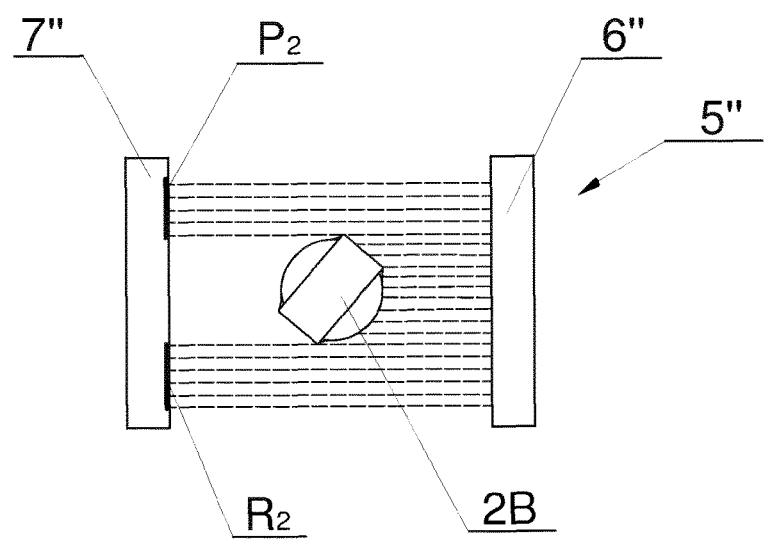

FIG. 12a shows a surface of the photosensitive element 7" as shown in FIG. 11a, but illuminated on two fragments—the areas $P_2$ and $R_2$ because of the presence of a rotated segment 2B, where $P_2<P_1$ and $R_2<R_1$. Depending on the position of the optical sensor 5" in relation to the segment 2, various situations are possible: where $P_2<P_1$ and $R_2<R_1$, where $P_2=P_1$ and $R_2<R_1$ or $R_2=R_1$, and $P_2<P_1$, as well as where $P_2=P_1$ and $R_2=R_1$ (the latter representing a situation where the deformation of the rod is "invisible" to the sensor). The values $P_1$ and $R_1$ indicated in FIG. 11a should be considered as the reference values. In practice certain limit values $P_g$ and $R_g$ corresponding to the values greater than the nominal rod diameter value should be entered into the controller associated with the optical sensor. It means that a certain dimension tolerance should be maintained for the rod diameter which may vary to some extent in the production process. The controller will generate the error of shape signal when one of the illuminated areas of the photosensitive element 7" is smaller than respectively $P_g$ or $R_g$. In the shape sensor assembly 12 (FIG. 8) comprising e.g. two surface optical sensors arranged at a suitable angle, in the situation where for one of the sensors $P_2=P_1$ and $R_2=R_1$ and for the other sensor $P_2<P_1$ and $R_2<R_1$, an error of shape signal generated by just one sensor would confirm that there is a rotated segment in the multi-segment rod. Irrespective of the position of the rotated segment the shape sensor assembly will always detect the shape error i.e. will find the rotated segment. The shape sensor assembly may comprise any number of optical sensors and a signal from each of them may be regarded as the confirmation of detection of a rotated segment.

Figure 13:
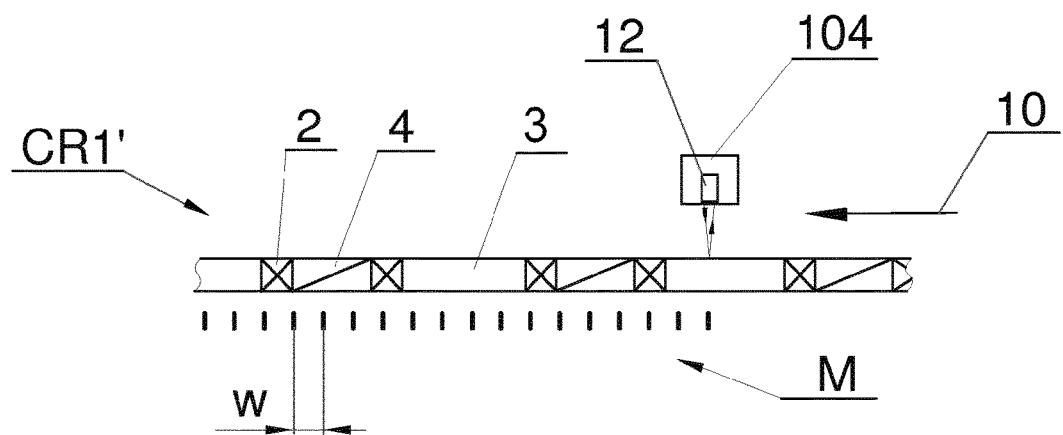
FIG. 13 shows the points of scanning on the continuous multi-segment filter rod of FIG. 2.

FIG. 13 shows an exemplary continuous multi-segment filter rod CR1'; the locations in which the scanning takes place during the transport of the rod in the direction 10 are indicated by short lines M. The scanning performed by means of the shape sensor assembly 12 takes place repeatedly at a frequency so adapted that the length of the shortest segment is scanned at least once. The time gap between the successive scannings of the rod is adjusted to be shorter than the value equal to the length of the shortest segment divided by the speed of movement of the rod. The distribution of the successive points of scanning on the moving rod as shown in FIG. 13 is just an exemplary illustration. In reality the number of such points of scanning is higher and will result from the frequency of scanning e.g. 10 kHz, 20 kHz, 50 kHz or 100 kHz depending of the used controller or computer and on the speed of movement of the rod which may range e.g. from 50 m/min to 600 m/min. The frequency of scanning may be adjusted depending on the speed of movement of the rod. The distances between the successive points of scanning have been indicated by "w" in FIG. 13. For example, if the frequency of scanning is 20 kHz and the speed of movement of the rod is 500 m/min, the surface of the rod will be scanned each time the rod is longitudinally transferred by 0,416 mm within the area of operation of the shape sensor assembly. It means that a segment 5 mm long will be scanned 12 times. An alternative solution is also possible in which a continuous multi-segment rod is not scanned along its whole length but only along its parts containing short segments.

Figure 14:
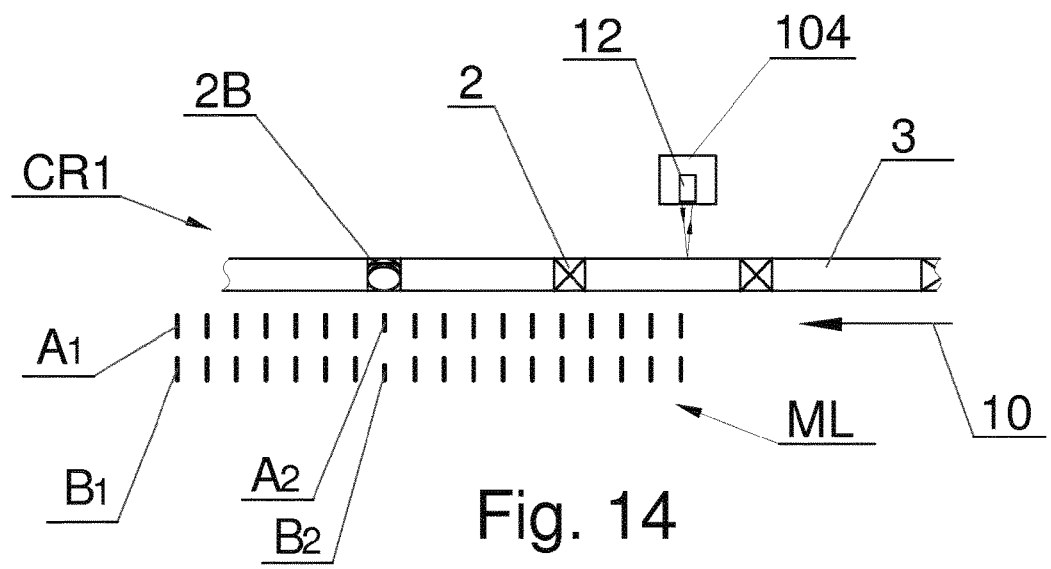
FIG. 14 shows the results of the scanning of the continuous multi-segment filter rod of FIG. 1 by means of the linear sensors.

FIG. 14 shows exemplary results of the scannings performed by the linear optical sensors in the form of short vertical lines ML. The values A1 and B1 have been registered for segments arranged correctly, and the values A2 and B2 have been registered for the rotated segment 2B. Basing of the measured values the individual filter rods S' comprising rotated segments may be discarded.

The invention claimed is:

1. A method of detection of rotated segments having a length close in size to a diameter of the rotated segments in a continuous multi-segment rod transferred in a machine used in tobacco industry, the method including generating a signal of an error of a shape of said continuous multi-segment rod, the rod comprising a plurality of segments arranged one after another in a common wrapping, in which the rod is transferred in a direction along a longitudinal axis of the rod and is simultaneously scanned by at least two optical linear sensors in a scanning plane, the scanning plane being perpendicular to the longitudinal axis of the rod, the at least two optical sensors having directions of scanning that are oriented at an angle between 40° and 60° with respect to each other, wherein the diameter of the rod is measured by repeated scans at a frequency such that a shortest segment of the rod is scanned at least once, results of the scans being compared with a predetermined reference value, and each difference between any of the results of the scans and the predetermined value is converted into the signal of the error of shape.

2. The method according to claim 1, wherein the rod is scanned by the at least two optical sensors, the directions of scanning of the at least two optical sensors being oriented at an angle of 45°.

3. A device for detection of rotated segments having a length close in size to a diameter of the rotated segments in a continuous multi-segment rod transferred in a machine used in tobacco industry, by generating a signal of an error of the shape of said rod, the rod comprising a plurality of segments arranged one after another in a common wrapping, the device comprising a conveyor to move the rod in a direction parallel to a longitudinal axis of the rod, at least two optical linear sensors for scanning the rod in a scanning plane, the scanning plane being perpendicular to the longitudinal axis of the rod, the at least two optical sensors having directions of scanning that are oriented at an angle between 40° and 60° with respect to each other, wherein the at least two optical sensors are configured to measure the diameter of the rod by repeated scans, a time gap between successive scans being adjustable, so that each segment is scanned at least once, the device further comprising a controller to compare results of the successive scans with a predetermined reference value and to convert each difference between any of the results of the scans and the predetermined value into the signal of the error of shape.

4. The device according to claim 3, wherein the at least two optical sensors comprise two optical sensors, the directions of scanning of the two optical sensors being oriented at an angle of 45°.

5. The device according to claim 4, wherein each of the at least two optical sensors comprises a source of radiation operating in the visible spectrum, and a photosensitive element, the source of radiation and the photosensitive element being located on mutually opposite sides of the rod.

6. The machine according to claim 5, wherein the sources of radiation of the at least two optical sensors operate in the visible spectrum.

7. The device according to claim 3, wherein the planes of scanning of the at least two sensors are substantially coplanar.

8. The device according to claim 3, wherein the at least two sensors scan areas of the rods that are substantially the same as one another.

9. A machine for producing multi-segment rods from a continuous multi-segment rod transferred therein, the machine comprising a device for detection of rotated segments contained in the continuous multi-segment rod, the segments having a length close in size to a diameter of the rotated segments, the device being configured to generate a signal of an error of a shape of said rod, the rod comprising a plurality of segments arranged one after another in a common wrapping, and the device comprising a conveyor to move the rod in a direction parallel to a longitudinal axis of the rod, at least two optical linear sensors for scanning the rod in a scanning plane, the scanning plane being perpendicular to the longitudinal axis of the rod, the at least two optical sensors having directions of scanning that are oriented at an angle between 40°, and 60°, with respect to each other, wherein the at least two optical sensors are configured to measure the diameter of the rod by repeated scans, a time gap between the successive scans being adjustable, so that each segment is scanned at least once, the device further comprising a controller to compare results of the successive scans with a predetermined reference value and to convert each difference between any of the results of the scans and the predetermined value into the signal of the error of shape.

10. The machine according to claim 9, wherein the at least two sensors comprises two optical sensors, wherein the directions of scanning of the optical sensors are oriented at an angle of 45°.

11. The machine according to claim 9, wherein each of the at least two optical sensors comprises a source of radiation, and a photosensitive element, the source of radiation and the photosensitive element being located on mutually opposite sides of the rod.

12. The machine according to claim 11, wherein the sources of radiation of the at least two optical sensors operate in the visible spectrum.

13. The machine according to claim 9, in wherein the planes of scanning of the at least two optical sensors are substantially coplanar.

* * * * *